(12) United States Patent
Guggisberg et al.

(10) Patent No.: US 7,675,191 B2
(45) Date of Patent: *Mar. 9, 2010

(54) DEVICE FOR THE FEEDING OF AUXILIARY OPERATING FACILITIES FOR A FUEL-ELECTRICALLY DRIVEN VEHICLE

(75) Inventors: Beat Guggisberg, Untersiggenthal (CH); Vishal Bisen, Turgi (CH)

(73) Assignee: ABB Schweiz AG, Baden (CH)

( * ) Notice: Subject to any disclaimer, the term of this patent is extended or adjusted under 35 U.S.C. 154(b) by 9 days.

This patent is subject to a terminal disclaimer.

(21) Appl. No.: 11/707,124

(22) Filed: Feb. 16, 2007

(65) Prior Publication Data

US 2007/0138982 A1    Jun. 21, 2007

Related U.S. Application Data

(63) Continuation of application No. PCT/CH2005/000486, filed on Aug. 19, 2005.

(30) Foreign Application Priority Data

Aug. 26, 2004   (EP)   ................................. 04405532

(51) Int. Cl.
*B60L 1/00* (2006.01)
(52) U.S. Cl. ....................................... 307/9.1
(58) Field of Classification Search ............. 307/12, 307/10.1, 9.1
See application file for complete search history.

(56) References Cited

U.S. PATENT DOCUMENTS 5,735,215 A    4/1998   Tegeler (Continued)

FOREIGN PATENT DOCUMENTS

DE    40 17 670 A1    12/1991

(Continued)

OTHER PUBLICATIONS

International Search Report dated Nov. 3, 2005 (with English translation of category of cited documents).

(Continued)

*Primary Examiner*—Robert L. DeBeradinis
(74) *Attorney, Agent, or Firm*—Buchanan Ingersoll & Rooney PC

(57) ABSTRACT

A device for the feeding of auxiliary operating facilities for a fuel-electrically driven vehicle with a combustion engine is stated, which device comprises a generator driven by the combustion engine and a rectifier connected with a generator on the AC voltage side, wherein the rectifier on the DC voltage side is connected with a first and a second connection of a DC voltage circuit. Alternatively, first and second rectifiers connected with the generator on the AC voltage side can be provided, wherein the first rectifier is connected on the DC voltage side with a first and a second connection of a first DC voltage circuit and the second rectifier on the DC voltage side with a first and a second connection of a second DC voltage circuit. Saving of space required and increased robustness and resistance to faults are achieved in that a first and a second step-down converter each is connected with the first and second connection of the DC voltage circuit, and that the first step-down converter is connected with a first DC voltage rail system for the feeding of first auxiliary operating facilities and that the second step-down converter is connected with a second DC voltage rail system for the feeding of second auxiliary operating facilities. As an alternative to the second step-down converter a further rectifier connected with the generator on the AC voltage side can also be provided, wherein then the first step-down converter is still connected with the first DC voltage rail system for the feeding of first auxiliary operating facilities and the further rectifier is connected with the second DC voltage rail system for the feeding of second auxiliary operating facilities.

30 Claims, 10 Drawing Sheets

U.S. PATENT DOCUMENTS

| | | | |
|---|---|---|---|
| 6,087,791 A | 7/2000 | Maruyama | |
| 6,107,691 A * | 8/2000 | Gore et al. | 290/1 R |
| 6,232,752 B1 * | 5/2001 | Bissell | 323/225 |
| 6,473,284 B1 * | 10/2002 | Ilic et al. | 361/91.1 |
| 6,495,964 B1 * | 12/2002 | Muthu et al. | 315/149 |
| 6,724,100 B1 * | 4/2004 | Gabriel | 307/9.1 |
| 7,057,376 B2 * | 6/2006 | Cook et al. | 323/207 |
| 7,547,982 B2 * | 6/2009 | Guggisberg et al. | 290/40 F |
| 2002/0113599 A1 * | 8/2002 | Hoffman | 324/547 |
| 2005/0288148 A1 * | 12/2005 | Kuras et al. | 477/43 |
| 2006/0152180 A1 * | 7/2006 | Tahara et al. | 318/139 |
| 2007/0170780 A1 * | 7/2007 | Guggisberg et al. | 307/10.1 |

FOREIGN PATENT DOCUMENTS

| | | |
|---|---|---|
| DE | 94 13 638 U1 | 2/1996 |
| DE | 196 38 620 A1 | 4/1998 |
| DE | 198 48 728 A1 | 4/2000 |
| DE | 200 01 113 U1 | 5/2000 |
| EP | 1 127 732 A2 | 8/2001 |
| JP | 06196991 A * | 7/1994 |
| WO | 96/10508 A1 | 4/1996 |

OTHER PUBLICATIONS

Written Opinion of the International Searching Authority.
European Search Report dated Dec. 1, 2005 (with English translation of category of cited documents).
Form PCT/IPEA/409 (International Preliminary Report on Patentability), English translation only.

* cited by examiner

DEVICE FOR THE FEEDING OF AUXILIARY OPERATING FACILITIES FOR A FUEL-ELECTRICALLY DRIVEN VEHICLE

RELATED APPLICATIONS

This application is based on and claims priority under 35 U.S.C. §119 to European Application No. 04405532.5, filed Aug. 26, 2004 and is a continuation application under 35 U.S.C. §120 of International Application No. PCT/CH2005/000486, filed Aug. 19, 2005 designating the U.S., the entire contents of both of which are hereby incorporated by reference.

TECHNICAL FIELD

The invention relates to the area of auxiliary operating facilities for fuel-electrically driven vehicles. It is based on a device for the feeding of auxiliary operating facilities for a fuel-electrically driven vehicle according to the preamble of the independent claims.

BACKGROUND INFORMATION

Today, auxiliary operating facilities for fuel-electrically driven vehicles are mainly employed in diesel-electric locomotives or large diesel-electric mine vehicles, where the auxiliary operating facilities are constructed as fans, air-conditioning systems, actuators, on-board network converters etc. Such auxiliary operating facilities are popularly fed by means of a suitable device. Such a device for the feeding of auxiliary operating facilities for a fuel-electrically driven vehicle is for example mentioned in the U.S. Pat. No. 6,087,791 and in the DE 200 01 113 U1. In it the device has a combustion engine, a generator driven by the combustion engine and a rectifier connected with the generator on the AC voltage side. On the DC voltage side the rectifier is connected with a first and a second connection of a DC voltage circuit. In addition, with the device according to DE 200 01 113 U1, a multiplicity of inverters is connected to the first and second connection of the DC voltage circuit, which inverters each supply the relevant auxiliary operating facility such as for example fan, air-conditioning system, actuator, on-board network converter etc. with electric energy. According to the U.S. Pat. No. 6,087,791 and the DE 200 01 113 U1 a drive inverter is also connected to the first and second connection of the DC voltage circuit, which drive inverter on the AC voltage side feeds one or several drive motors of the vehicle.

It is also conceivable that a second rectifier connected with a generator is provided. The second rectifier is then connected on the DC voltage side with a first and a second connection of a second DC voltage circuit, while a second drive inverter is connected to the first and second connection of the second DC voltage circuit, which second drive inverter on the AC voltage side feeds one or several drive motors of the vehicle.

Since the power requirement of such drive motors is very high, a DC voltage of several kilovolts is typically present between the first and the second connection of the DC voltage circuit in order to be able to provide the appropriate power. Problematic in this context with the device for the feeding of auxiliary operating facilities for a fuel-electrically driven vehicle of the U.S. Pat. No. 6,087,791 and the DE 200 01 113 U1 is that the inverters connected to the first and second connection of the DC voltage circuit have to be designed to the high DC voltage mentioned above, i.e. the power semiconductor switches of the respective inverters have to have a high blocking capability and suitable protective facilities and operating methods specifically adapted to these. The construction of the inverters is thus highly complicated, susceptible to faults and accordingly requires a lot of space. In addition, insulation distances of the supply lines and rails to the inverters and between the inverters themselves have to be maintained, which requires additional space. This complicated and space-intensive construction of the inverters and the device for the feeding of auxiliary operating facilities consequently causes major expenditure in terms of installation and maintenance. Especially a simple, compact and robust construction of the device for the feeding of auxiliary operating facilities however is extremely desirable with a fuel-electrically driven vehicle.

In the DE 94 13 638 U1 a device for the feeding of auxiliary operating facilities for a fuel-electrically driven vehicle is also disclosed, which device has a first combustion engine and a first generator driven by the first combustion engine. On the AC voltage side with the first generator, a first rectifier assigned to the first generator is connected, wherein a first step-down converter is connected downstream of the first rectifier. An assigned first DC voltage circuit is connected downstream of the first step-down converter with which first DC voltage circuit a first inverter for the feeding of auxiliary operating facilities is connected. In addition to this, the device of the DE 94 13 638 U1 has a second combustion engine and a second generator driven by the second combustion engine. On the AC voltage side a second rectifier assigned to the second generator is connected to the second generator while a second step-down converter is connected downstream of the second rectifier. An assigned second DC voltage circuit is connected downstream of the second step-down converter with which second DC voltage circuit a second inverter for the feeding of auxiliary operating facilities is connected.

SUMMARY

A device is disclosed for the feeding of auxiliary operating facilities for a fuel-electrically driven vehicle which has low space requirements and is additionally sturdy and not susceptible to faults.

An exemplary device for the feeding of auxiliary operating facilities for a fuel-electrically driven vehicle comprises a combustion engine, a generator driven by the combustion engine, and a rectifier connected with the generator on the AC voltage side and assigned to the generator, wherein the rectifier on the DC voltage side is connected to a first and a second connection of a DC voltage circuit assigned to the rectifier and connected downstream of the rectifier. A first and a second step-down converter is provided, wherein the first and second step-down converter each is connected to the first and second connection of the DC voltage circuit and the first step-down converter is further connected to a first DC voltage rail system for the feeding of first auxiliary operating facilities assigned to a first step-down converter connected downstream of the first step-down converter and the second step-down converter is connected with a second DC voltage rail system for the feeding of second auxiliary operating facilities assigned to the second step-down converter and connected downstream of the second step-down converter. Inverters of the respective auxiliary operating facilities and/or DC voltage converters of the auxiliary operating facilities are connected to the first and second DC voltage rail system for their feeding.

Through such an exemplary embodiment of the two step-down converters the voltage on the respective DC voltage rail system can be set with advantage. This setting is performed such that the voltage on the DC voltage rail system is lower than the voltage between the first and second connection of the DC voltage circuit. By means of the voltage of the DC voltage rail system which is lower compared with the DC voltage circuit the insulation distance of the DC voltage rail system, i.e. of the rail system legs of the DC voltage rail system, can be reduced so that space can be saved with advantage and the installation and maintenance expenditure kept low in addition. Furthermore feeding of the DC voltage rail system not affected by the fault or failure is still possible by means of the respective step-down converters in the event of a fault or a failure of a step-down converter, so that the auxiliary operating facilities can continue to be fed via their inverters and/or DC voltage converters. As a result, the exemplary device is highly robust, not susceptible to faults and characterized by high availability.

By means of the voltage of the DC voltage rail system which is lower in comparison with the DC voltage circuit the inverters and/or DC voltage converters of the auxiliary operating facilities, i.e. the power semiconductor switches of the inverters and/or DC voltage converters with corresponding protective facilities and operating methods for example need not be designed to the high voltage of the DC voltage circuit as is known, but merely to the lower voltage of the DC voltage rail system. Advantageously the construction of the inverters and/or DC voltage converters is simplified as a result, the inverters and/or DC voltage converters are less susceptible to faults and require correspondingly less space. In addition, the simple and space-saving construction of the inverters and/or DC voltage converters causes less installation and maintenance expenditure.

As an alternative to the second step-down converter a further rectifier connected with the generator on the AC voltage side and assigned to the generator can be provided wherein the first step-down converter is still connected with the first DC voltage rail system for the feeding of first auxiliary operating facilities assigned to the first step-down converter and connected downstream of the first step-down converter and the further rectifier is connected with the second DC voltage rail system for the feeding of the auxiliary operating facilities assigned to the further rectifier and connected downstream of the further rectifier.

Through the first step-down converter and the further rectifier the voltage on the DC voltage rail system can likewise be set with advantage as realizable with the exemplary embodiment with two step-down converters. By means of the voltage of the DC voltage rail system achieved which is lower in comparison with the DC voltage circuit, the insulation distance of the DC voltage rail system, i.e. the rail system legs of the DC voltage rail system can be reduced so that with advantage space can be saved and the installation and maintenance expenditure kept low in addition. Furthermore feeding of the second DC voltage rail system not affected by the fault or failure is still possible by means of the further rectifier in the event of a fault or a failure of the first step-down converter, so that the second auxiliary operating facilities can continue to be fed via their inverters and/or DC voltage converters. As a result, the device according to the invention is highly robust, not susceptible to faults and characterized by high availability.

With the alternative exemplary embodiment with the first step-down converter and the further rectifier, too, the inverters and/or DC voltage converters of the auxiliary operating facilities for instance need not be designed for the high voltage of the DC voltage circuit as is known from the prior art because of the voltage of the DC voltage rail system, which is lower in comparison with the DC voltage circuit, but merely for the lower voltage of the DC voltage rail system. Advantageously, the construction of the inverters and/or DC voltage converters is simplified as a result, the inverters and/or DC voltage converters are less susceptible to faults and require correspondingly less space. In addition, the simple and space-saving construction of the inverters and/or DC voltage converters causes less installation and maintenance expenditure.

As a further exemplary embodiment of the device for the feeding of auxiliary operating facilities for a fuel-electrically driven vehicle comprises a combustion engine, a generator driven by the combustion engine and first and second rectifiers connected with the generator on the AC voltage side and assigned to the generator, wherein the first rectifier is connected on the DC voltage side with a first and a second connection of a first DC voltage circuit assigned to the first rectifier and connected downstream of the first rectifier and the second rectifier on the DC voltage side with a first and a second connection of a second DC voltage circuit assigned to the second rectifier and connected downstream of the second rectifier. Accordingly, a first and a second step-down converter is then provided wherein the first step-down converter is connected with the first and second connection of the first DC voltage circuit and the second step-down converter with the first and second connection of the second DC voltage circuit and the first step-down converter is further connected with a second DC voltage rail system for the feeding of the auxiliary operating facilities assigned to the second step-down converter and connected downstream of the second step-down converter. Inverters of the auxiliary operating facilities and/or DC voltage converters of the auxiliary operating facilities are then also connected to the first and second DC voltage rail system for their feeding. The advantages mentioned above also apply to this alternative exemplary embodiment.

BRIEF DESCRIPTION OF THE DRAWINGS

These and further objects, advantages and characteristics of the present invention become obvious from the following detailed description of preferred embodiments of the invention in connection with the drawing. The figures show.

DETAILED DESCRIPTION

Figure 1:
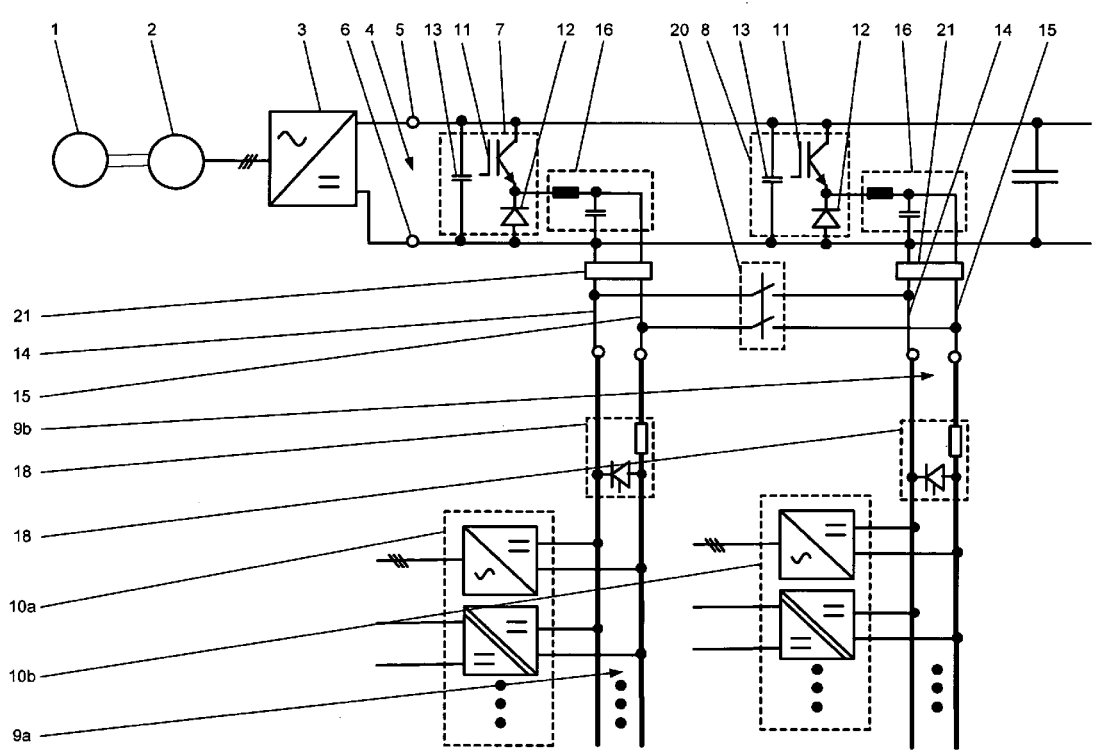
FIG. 1 shows a first exemplary embodiment of a device for the feeding of auxiliary operating facilities for a fuel-electrically driven vehicle.

The reference numbers used in the drawing and their meaning are listed in summary in the list of reference numbers. As a matter of principle, identical parts are provided with identical reference numbers in the Figures. The described embodiments stand as examples for the subject disclosure and have no restrictive effect.

In FIG. 1, a first exemplary embodiment of the device for the feeding of auxiliary operating facility for a fuel-electrically driven vehicle is shown. The exemplary device according to FIG. 1 comprises a combustion engine 1, a generator 2 driven by the combustion engine 1 and a rectifier 3 connected on the AC voltage side with the generator 2 and assigned to the generator 2, wherein the rectifier 3 on the DC voltage side is connected with a first and second connection 5, 6 of a DC voltage circuit 4 assigned to the rectifier 3 and connected downstream of the rectifier 3. A first and a second step-down converter 7, 8 is provided, wherein each the first and the second step-down converter 7, 8 is connected with the first and second connection 5, 6 of the DC voltage circuit 4. As shown in FIG. 1, the first and the second step-down converter can be connected downstream of the DC voltage circuit 4. In addition, the first step-down converter 7 is connected with a first DC voltage rail system 9a for the feeding of first auxiliary operating facilities 10a assigned to the first step-down converter 7 and connected downstream of the first step-down converter 7 and the second step-down converter 8 is connected with a first DC voltage rail system 9b for the feeding of first auxiliary operating facilities 10b assigned to the second step-down converter 8 and connected downstream of the second step-down converter 8. According to FIG. 1, each DC voltage rail system 9a, 9b has two rail system legs. As exemplified in FIG. 1, inverters of the first auxiliary operating facilities 10a and/or DC voltage converters of the first auxiliary operating facilities 10a are connected to the first DC voltage rail system 9a and inverters of the second auxiliary operating facilities 10b and/or DC voltage converters of the second auxiliary operating facilities 10b are connected to the second DC voltage rail system 9b for their feeding.

Through the two step-down converters 7, 8 the voltage can be set on each respective DC voltage rail system 9a, 9b with advantage. This setting is carried out such that the voltage on the DC voltage rail system 9a, 9b is lower than the voltage between the first and second connection 5, 6 of the DC voltage circuit 4. Through the voltage of the DC voltage rail system 9a, 9b which is lower in comparison with the DC voltage circuit 4 the insulation distance of the rail system legs of the respective DC voltage rail system 9a, 9b can be reduced so that advantageously space can be saved and additionally the installation and maintenance expenditure kept low or minimized. Furthermore, further feeding of the second DC voltage rail system 9b not affected by the fault or the failure for example of the first step-down converter 7 is possible through the respective second step-down converter 8 so that the second auxiliary operating facilities 10b can continue to be fed by way of their inverters and/or DC voltage converters. The exemplary device is thus highly robust, not susceptible to faults and characterized by high availability.

As exemplified in FIG. 1, the respective step-down converter 7, 8 can be formed through a series circuit of a controllable power semiconductor switch 11 with a diode 12 and through a capacity 13 connected in parallel with the series circuit of the controllable power semiconductor switch 11 with the diode 12. As exemplified in FIG. 1, the controllable power semiconductor switch 11 can be based on bipolar transistor with gate electrode arranged in an insulated manner (IGBT). However, the controllable power semiconductor switch can be based on power MOSFET, a turn-off thyristor (GTO—Gate Turn-Off Thyristor) or an integrated thyristor with commutated gate electrode (IGCT—Integrated Gate Commutated Thyristor). As exemplified in FIG. 1, the controllable power semiconductor switch 11 with the respective step-down converter 7, 8 can be additionally connected with the first connection 5 of the DC voltage circuit 4 and the diode 12 with the second connection 6 of the DC voltage circuit 4. In addition, with the respective step-down converter 7, 8, the diode 12 can be connected through a first connection 14 and the connection point of the diode 12 with the controllable power semiconductor switch 11 through a second connection 15 with the respective DC voltage rail system 9a, 9b, i.e. with the first step-down converter 7 the diode 12 is connected through the first connection 14 and the connecting point of the diode 12 with the controllable power semiconductor switch 11 is connected with the second DC voltage rail system 9b through the second connection 15. The respective step-down converter 7, 8 consequently manages with a minimum number of components and can thus be realized very easily and space-savingly. Through the low number of components the first and second step-down converter 7, 8 is particularly robust and not susceptible to faults and therefore has a high availability.

As exemplified in FIG. 1 with the respective step-down converter 7, 8, i.e. with the first step-down converter 7 and with the second step-down converter 8 a filter circuit 16 can be additionally connected between the first connection 14 and the respective DC voltage rail system 9a, 9b and to the second connection 15. The filter circuit 16 advantageously results in that undesirable voltage fluctuations and current fluctuations created through switching actions of the respective step-down converter 7, 8 are filtered out so that the voltage of the first and second DC voltage rail system 9a, 9b, i.e. the voltage present between the respective rail system legs, is nearly a DC voltage.

Figure 2:
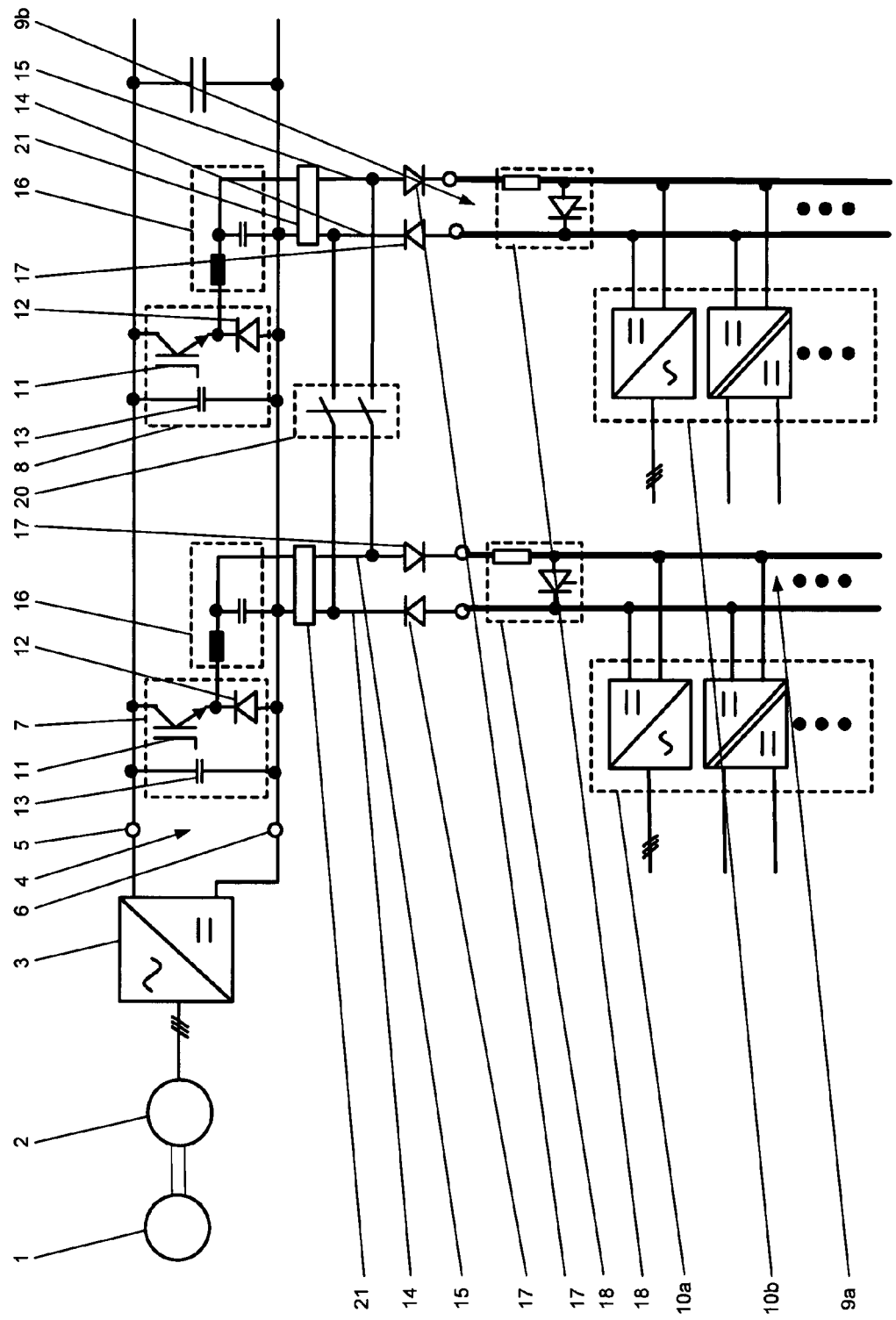
FIG. 2 shows a second exemplary embodiment of the device.

In contrast to the first exemplary embodiment shown in FIG. 1, a current direction limitation element 17 each can be connected with the respective step-down converter 7, 8 in the first connection 14 and in the second connection 15 in a second exemplary embodiment of the device as shown in FIG. 2. The respective current direction limitation element 17 serves to ensure that only a current in defined current direction flows from the respective step-down converter 7, 8 to the respective DC voltage rail system 9a, 9b and, in a defined manner, back again. As a result, it is advantageously avoided that a fault current, for example caused through faults of the respective DC voltage rail system 9a, 9b and/or a fault in one or in several auxiliary operating facilities 10a, 10b can flow back to the respective step-down converter 7, 8 and damage or even destroy the respective step-down converter 7, 8. The respective current direction limitation element 17 according to FIG. 2 is preferably designed as a diode and can thus be advantageously realized very easily and space-savingly.

Figure 3:
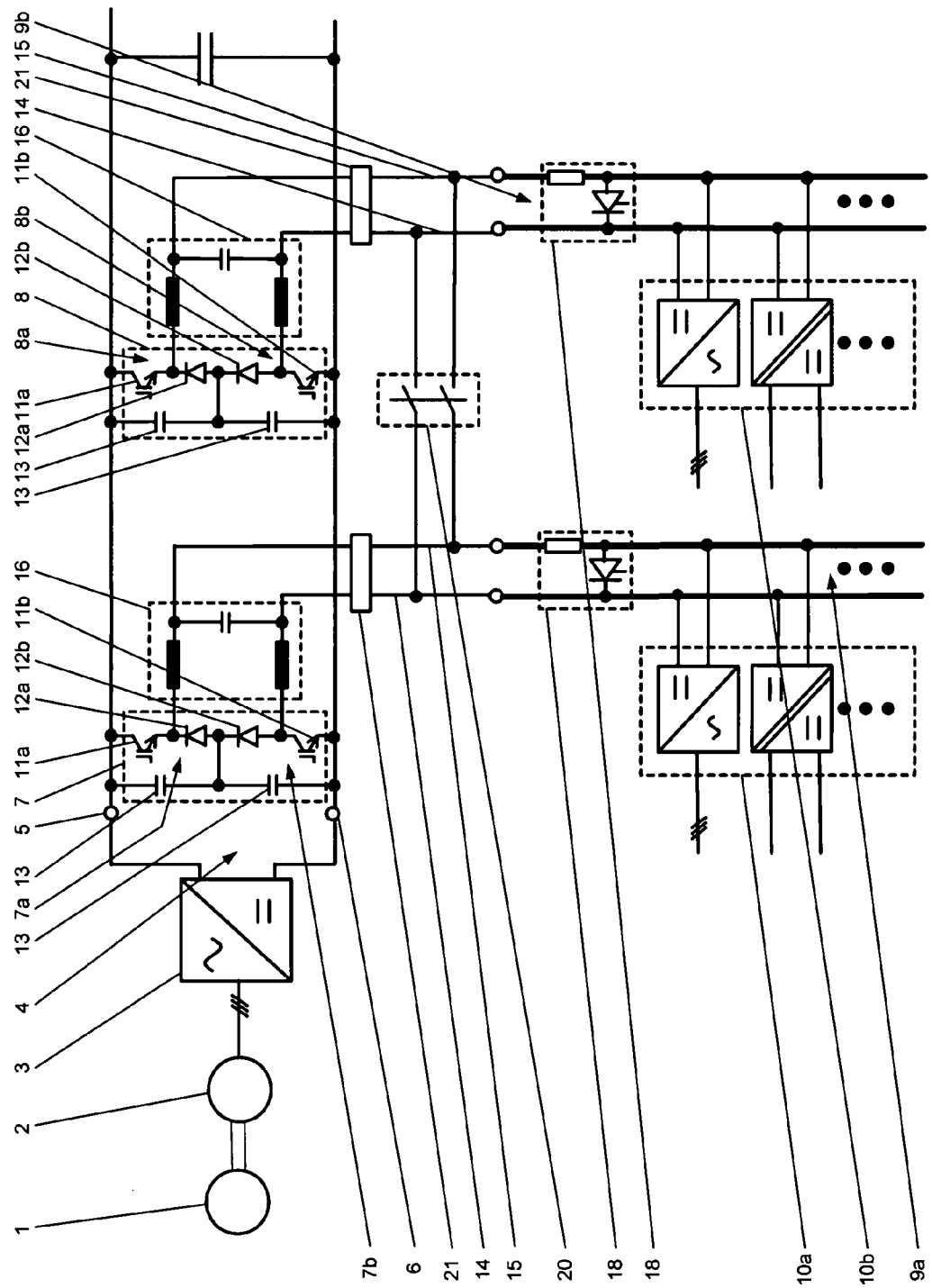
FIG. 3 shows a third exemplary embodiment of the device.

In contrast with the first and second exemplary embodiments of the device shown in FIG. 1 and FIG. 2, the respective step-down converter 7, 8 in a third exemplary embodiment of the device shown in FIG. 3, is formed through a first and a second series circuit 7a, 7b, 8a, 8b each of a controllable power semiconductor switch 11a, 11b with a diode 12a, 12b and through a capacity 13 each connected in parallel with each series circuit, wherein, with the respective step-down converter 7,8 the diode 12a of the first series circuit 7a, 8a is connected with the diode 12b of the second series circuit 7b, 8b. As shown in FIG. 3, the controllable power semiconductor switch 11a, 11b can be based on a bipolar transistor with gate electrode designed in an insulated manner (IGBT). However, the controllable power semiconductor switch can be based on a power MOSFET, a turn-off thyristor (GTO—Gate Turn-Off Thyristor) or an integrated thyristor with commutated gate electrode (IGCT—Integrated Gate Commutated Thyristor). As exemplified in FIG. 3 with the respective step-down converter 7, 8, the controllable power semiconductor switch 11a of the first series circuit 7a, 8a can be connected with the first connection 5 of the DC voltage circuit 4 and the controllable power semiconductor switch 11b of the second series circuit 7b, 8b with the second connection 6 of the DC voltage circuit 4. In addition, with the respective step-down converter 7, 8, the connecting point of the diode 12a of the first series circuit 7a, 8a with the controllable power semiconductor switch 11a of the first series circuit 7a, 8a is connected with the respective DC voltage rail system 9a, 9b through a first connection 14, i.e. with the first step-down converter 7 the connecting point of the diode 12a of the first series circuit 7a with the controllable power semiconductor switch 11a is connected with the first DC voltage rail system 9a through the first connection 14 and with the second step-down converter 8 the connecting point of the diode 12a of the first series circuit 8a with the controllable power semiconductor switch 11a of the first series circuit 8a is connected with the second DC voltage rail system 9b through the first connection 14. In addition, with the respective step-down converter 7, 8, the connecting point of the diode 12b of the second series circuit 7b, 8b with the controllable power semiconductor switch 11b of the second series circuit 7b, 8b is connected with the respective DC voltage rail system 9a, 9b through a second connection 15, i.e. with the first step-down converter 7 the connecting point of the diode 12b of the second series circuit 7b with the controllable power semiconductor switch 11b is connected with the first DC voltage rail system 9a through a second connection 15 and with the second step-down converter 8 the connecting point of the diode 12b of the second series circuit 8b with the controllable power semiconductor switch 11b of the second series circuit 8b is connected with the second DC voltage rail system 9b through a second connection 15. Through the embodiment of the first and second step-down converter 7, 8 described above a voltage of the DC voltage circuit 4 which is higher compared with the exemplary embodiment of the first and second step-down converter 7, 8 shown in FIG. 1 and FIG. 2 can be connected since this voltage is split over the two capacities 13 of the respective step-down converter 7, 8. If however a comparable voltage of the DC voltage 4 as with the exemplary embodiment of the first and second step-down converter 7, 8 according to FIG. 1 and FIG. 2 is selected, more economical low-voltage semiconductors can be used for the relevant controllable power semiconductor switches 11a, 11b and diodes 12a, 12b because of the splitting of this voltage over the two capacities 13, which can be operated with a high switching frequency. Step-down converters 7, 8 designed in this way advantageously generate less undesirable voltage fluctuations and current fluctuations and consequently cause less EMC problems. In addition, step-down converters 7, 8 designed in this way only have minimum conductance and switching losses so that the step-down converter 7, 8 can be operated particularly efficiently. The respective step-down converter 7, 8 exemplified in FIG. 3 additionally manages to get by with a minimum quantity of components and can therefore be realized very easily and space-savingly. Through the low quantity of components the first and second step-down converters 7, 8 are particularly robust and not susceptible to faults and therefore have a high availability.

As shown in FIG. 3 with the respective step-down converter 7, 8 a filter circuit 16 is connected between the first connection 14 and the respective DC voltage rail system 9a, 9b and between the second connection 15 and the respective DC voltage rail system 9a, 9b. The filter circuit 16 advantageously results in that undesirable voltage fluctuations and current fluctuations created through switching actions of the respective step-down converter 7, 8 are filtered out so that the voltage of the first and second DC voltage rail system 9a, 9b, i.e. the voltage present between the rail system legs of the first and second DC voltage rail system 9a, 9b, is nearly a DC voltage.

Figure 4:
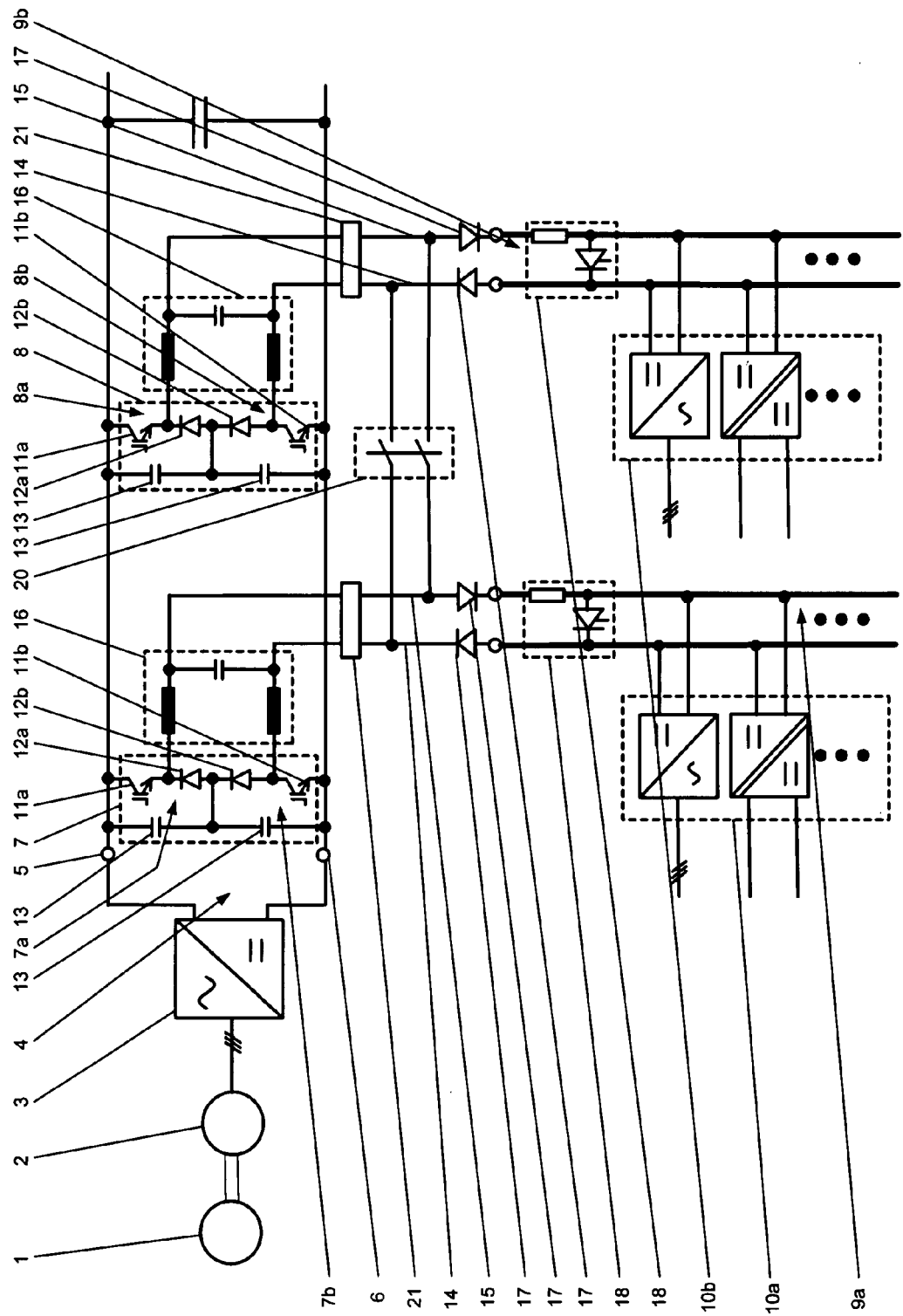
FIG. 4 shows a fourth exemplary embodiment of the device.

In a fourth exemplary embodiment of the device shown in FIG. 4, in contrast to the third exemplary embodiment according to FIG. 3, a current direction limitation element 17 can be connected with the respective step-down converter 7, 8 in the first connection 14 and in the second connection 15. The respective current direction limitation element 17 serves to ensure that only a current in defined current direction flows from the respective step-down converter 7, 8 to the respective DC voltage rail system 9a, 9b and, in a defined manner, back again. As a result it is advantageously avoided that a fault current, for instance caused through a fault of the respective DC voltage rail system 9a, 9b and/or a fault in one or in several auxiliary operating facilities 10a, 10b, can flow back to the respective step-down converter 7, 8 and damage or even destroy the respective step-down converter 7, 8. The respective current direction limitation element 17 according to FIG. 4 is preferably designed as a diode and therefore advantageously realized very easily and space-savingly.

Figure 5:
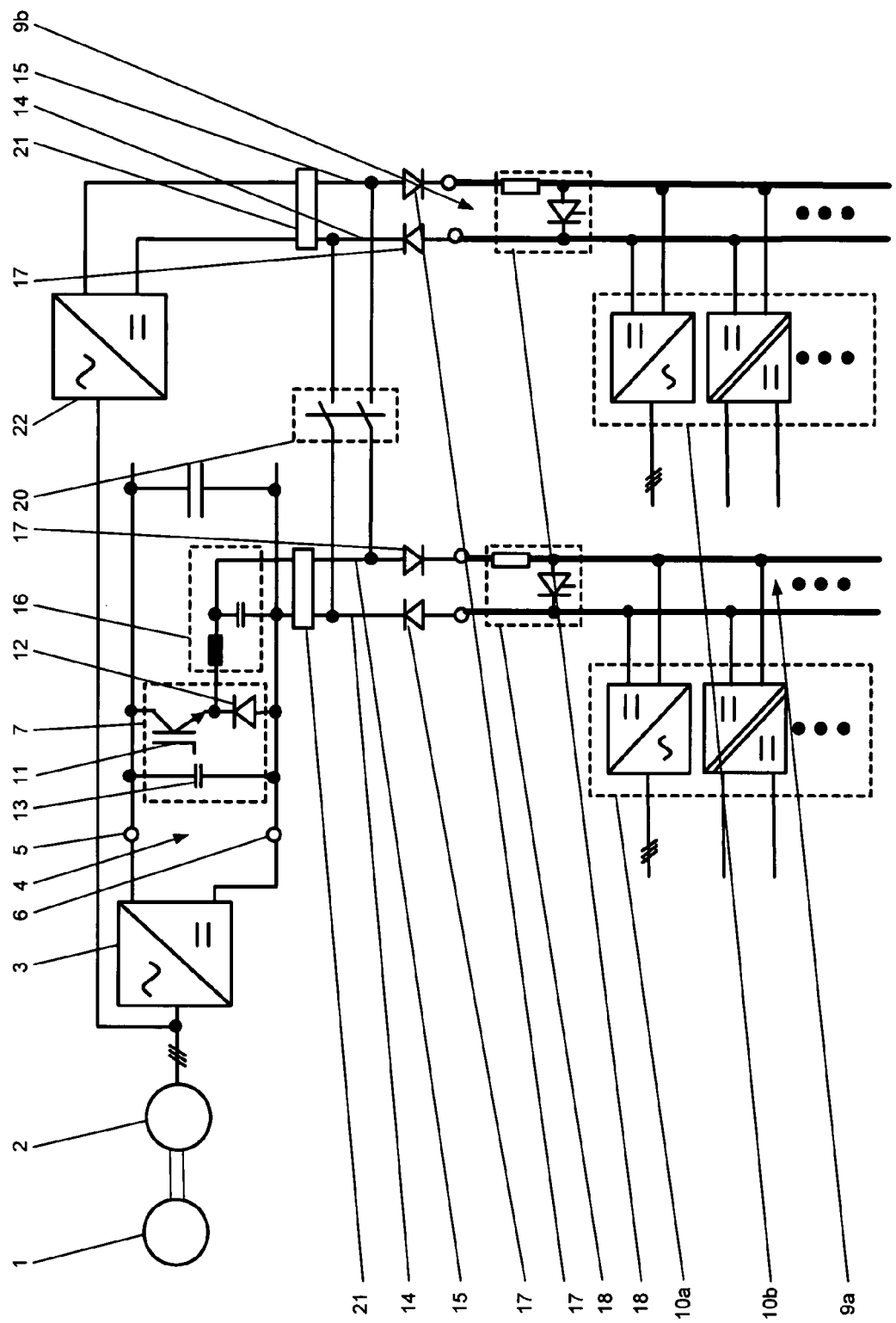
FIG. 5 shows a fifth exemplary embodiment of the device.
Figure 6:
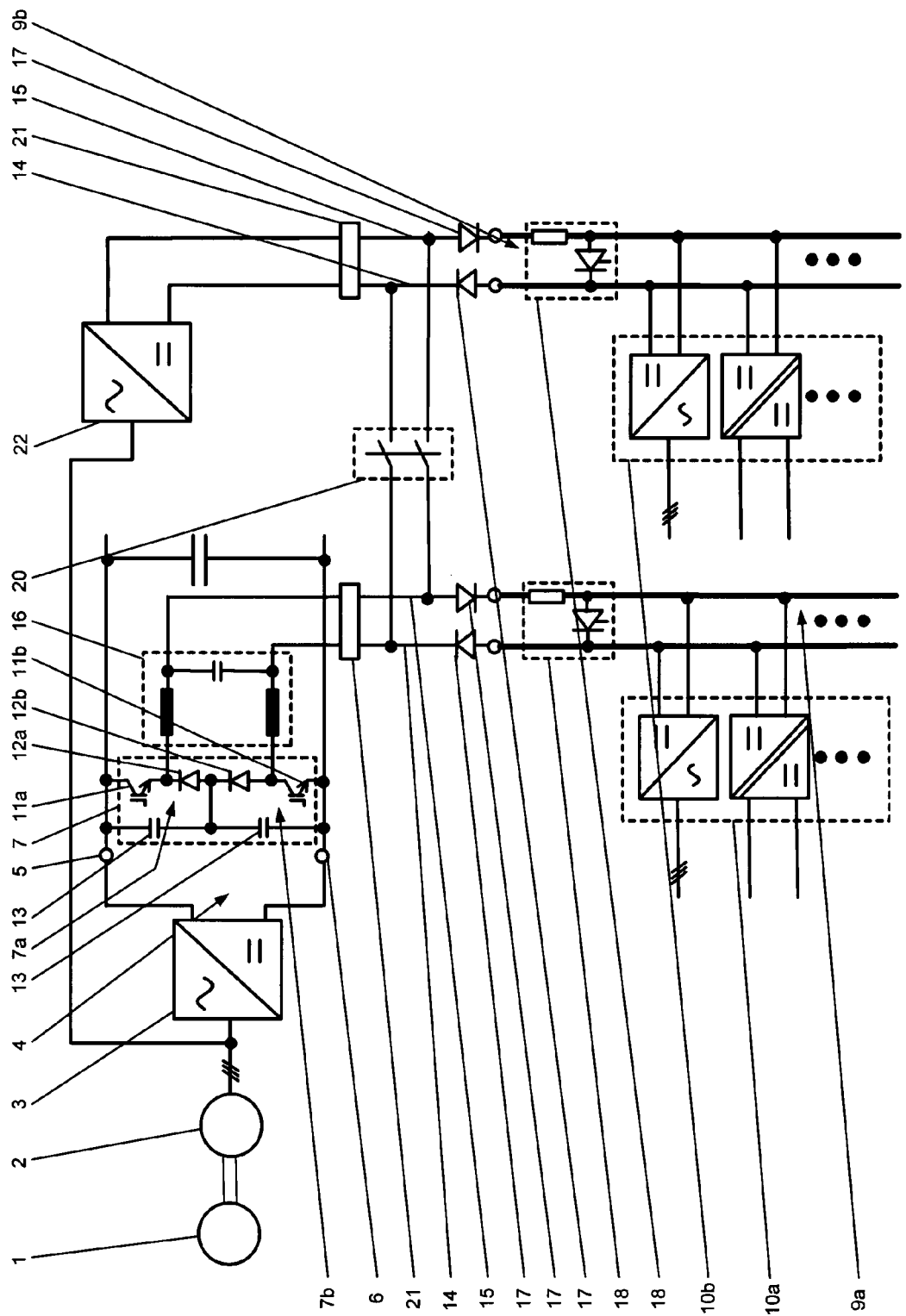
FIG. 6 shows a sixth exemplary embodiment of the device.

In a fifth and sixth exemplary embodiment of the device as exemplified in FIG. 5 and FIG. 6, a further rectifier 22 connected with the generator 2 and assigned to the generator 2 on the AC voltage side is provided alternatively to the first, second, third and fourth exemplary embodiments according to FIG. 1, FIG. 2, FIG. 3 and FIG. 4 instead of the step-down converter 8, wherein the first step-down converter 7 is connected with the first DC voltage rail system 9a for the feeding of first auxiliary operating facilities 10a assigned to the first step-down converter 7 and connected downstream of the first step-down converter 7 and the further rectifier 22 is connected with the second DC voltage rail system 9b for the feeding of second auxiliary operating facilities 10b assigned to the further rectifier 22 and connected downstream of the further rectifier 22. As exemplified in FIG. 5 and FIG. 6, the first step-down converter 7 is connected downstream more preferably of the DC voltage circuit 4. According to FIG. 5 and FIG. 6 the further rectifier 22 is connected with the second DC voltage rail system 9a through a first connection 14 and through a second connection 15. In addition, the first step-down converter 7 shown in FIG. 5 can be embodied and connected or switched according to the first step-down converter shown in FIG. 1 and FIG. 2 and has the already mentioned advantages. Moreover the first step-down converter 7 exemplified in FIG. 6 is designed and connected or switched according to the first step-down converter exemplified in FIG. 3 and FIG. 4 and also has the discussed advantages.

Through the first step-down converter 7 and the further rectifier 22 the voltage on the respective DC voltage rail system 9a, 9b can be set with advantage. This setting is performed such that the voltage on the DC voltage rail system 9a, 9b is lower than the voltage between the first and second connection 5, 6 of the DC voltage circuit 4. Through the voltage of the DC voltage rail system 9a, 9b which is lower in comparison with the DC voltage circuit 4 the insulation distance of the rail system legs of the DC voltage rail system 9a, 9b can be reduced so that advantageously space can be saved and additionally the installation and maintenance expenditure can be kept low or minimized. Furthermore, further feeding of the second DC voltage rail system 9b not affected by the fault or the failure for example of the first step-down converter 7 is possible through the further rectifier 22 so that the second auxiliary operating facilities 10b can continue to be fed by way of their inverters and/or DC voltage converters. The device according to the invention is thus highly robust, not susceptible to faults and characterized by high availability.

As exemplified in FIG. 5 and FIG. 6, a current direction limitation element 17 each can be connected to the first connection 14 and to the second connection 15 with the further rectifier 22 as well as with the first step-down converter 7. The respective current direction limitation element 17 serves to ensure that only a current flows in defined current direction from the respective step-down converter 7, 8 to the respective DC voltage rail system 9a, 9b and, in a defined manner, back again. As a result, it is advantageously avoided that a fault current, for example caused through a fault of the respective DC voltage rail system 9a, 9b and/or a fault in one or in several auxiliary operating facilities 10a, 10b, is able to flow back to the first step-down converter 7 or the further rectifier 22 and damage or even destroy the first step-down converter 7 or the further rectifier 22. The respective current direction limitation element 17 according to FIG. 5 and FIG. 6 is preferably designed as a diode and can therefore be advantageously realized highly simply and space-savingly.

As exemplified in FIG. 5 and FIG. 6, to isolate the faulty or failed first step-down converter 7 or the further rectifier 22 as discussed, an isolating element 21 can be connected into the first and second connection 14, 15 both with the further rectifier 22 and the first step-down converter 7. As a result, it is advantageously ensured that the faulty or failed first step-down converter 7 or further rectifier 22 does not for example short-circuit the corresponding first and second connection 14, 15. The isolating element 21 can be embodied as low-inductive switch, for example as a mechanical or controllable power semiconductor switch, or as a fuse.

With all exemplary embodiments of the device shown in FIG. 1 to FIG. 6, the first and the second DC voltage rail system 9a, 9b each can have an overvoltage limitation network 18. The overvoltage limitation network 18 is formed through a resistor and a controllable switch, e.g., a controllable power semiconductor switch, wherein the overvoltage limitation network 18 is actuated by closing the switch when an overvoltage of the voltage of the respective DC voltage rail system 9a, 9b occurs. Advantageously, when the switch is actuated, energy of the DC voltage rail system 9a, 9b is converted into heat in the resistor and consequently the voltage of the DC voltage rail system 9a, 9b reduced easily, quickly and effectively. The actuation of the overvoltage limitation network 18 preferably takes place for a specified period of time. This period of time is preferably specified as a function of the thermal capacity of the resistor. Actuation takes place according to criteria known to the expert which will not be discussed in more detail at this point.

In addition to this, with all exemplary embodiments of the device shown in FIG. 1 to FIG. 6, a connecting element 20 can be connected between the first connection 14 relative to the first DC voltage rail system 9a and the first connection 14 relative to the second DC voltage rail system 9b and between the second connection 15 relative to the first DC voltage rail system 9a and the second connection 15 relative to the second DC voltage rail system 9b. In normal operation of the device according to the invention the connecting element 20 is open, i.e. the first connection 14 relative to the first DC voltage rail system 9a and the first connection 14 relative to the second DC voltage rail system 9b are not connected with each other and the second connection 15 relative to the first DC voltage rail system 9a and the second Connection 15 relative to the second DC voltage rail system 9b are not connected with each other either. In the event of a fault or a failure for example of the first step-down converter 7 the connecting element 20 is closed, i.e. the first connection 14 relative to the first DC voltage rail system 9a and the first connection 14 relative to the second DC voltage rail system 9b are then connected with each other and the second connection 15 relative to the first DC voltage rail system 9a and the second connection 15 relative to the second DC voltage rail system 9b are then also connected. Feeding of the first DC voltage rail system 9a Is thus advantageously effected by way of the second step-down converter 8 and the further rectifier 22 respectively so that the first auxiliary operating facilities 10 can continue to be fed via their inverters and/or DC voltage converters. Such a possible redundant feed of the respective DC voltage rail system 9a, 9b brings about further improvement of the robustness and the non-susceptibility to faults, while the availability can be further increased at the same time. The connecting element 20 can be embodied as a low-inductive switch, for example as mechanical or as controllable power semiconductor switch. To isolate a faulty or failed step-down converter 7, 8 as discussed, an isolating element 20 is connected into the first and second connection 14, 15 with the respective step-down converter 7, 8 with the exemplary embodiments of the device shown in FIG. 1 to FIG. 4. As a result, it is advantageously ensured that the faulty or failed step-down converter 7, 8 does not for example short-circuit the corresponding first and second connection 14, 15. The isolating element 20 is preferably embodied as a low-inductive switch, for example as a mechanical or controllable power semiconductor switch or as a fuse.

In a seventh, eighth, ninth and tenth exemplary embodiments of the device shown in FIG. 7, FIG. 8, FIG. 9 and FIG. 10, alternatively to the first, second, third, fourth, fifth and sixth exemplary embodiment shown in FIG. 1, FIG. 2, FIG. 3, FIG. 4, FIG. 5 and FIG. 6 instead of a single rectifier 3 connected on the AC voltage side with the generator 2, first and second rectifiers 3a, 3b assigned to the generator 2 can be connected with the generator 2 on the AC voltage side, wherein the first rectifier 3a on the DC voltage side is connected with a first and a second connection 5a, 6a of a first DC voltage circuit 4a assigned to the first rectifier 3a and connected downstream of the first rectifier 3a and the second rectifier 3b on the DC voltage side with a first and a second connection 5b, 6b of a second DC voltage circuit 4b assigned to the second rectifier 3b and connected downstream of the second rectifier 3b. A first and a second step-down converter 7, 8 is then provided, wherein the first step-down converter 7 is connected with the first and second connection 5a, 6a of the first DC voltage circuit 4a and the second step-down converter 8 with the first and second connection 5b, 6b of the second DC voltage circuit 4b. In addition, the first step-down converters 7 is connected with a first DC voltage rail system 9a for the feeding of the auxiliary operating facilities 10a assigned to the first step-down converter 7 and connected downstream of the first step-down converter 7 and the second step-down converters 8 is connected with a second DC voltage rail system 9b for the feeding of the auxiliary operating facilities 10b assigned to the second step-down converter 8 and connected downstream of the second step-down converter 8. As exemplified in FIG. 7 to FIG. 10, the first step-down converter 7 can be connected downstream of the first DC voltage circuit 4a and the second step-down converter 8 can be connected downstream of the second DC voltage circuit 4b.

As exemplified in FIG. 7, FIG. 8, FIG. 9 and FIG. 10, each DC voltage rail system 9a, 9b has two rail system legs. As shown in FIG. 7, FIG. 8, FIG. 9 and FIG. 10, inverters of the first auxiliary operating facilities 10a and/or DC voltage converters of the first auxiliary operating facilities 10a can be connected to the first DC voltage rail system 9a and as FIG. 7, FIG. 8, FIG. 9 and FIG. 10 inverters of the second auxiliary operating facilities 10b and/or DC voltage converters of the second auxiliary operating facilities 10b are connected to the second DC voltage rail system 9b for their feeding.

Through the two step-down converters 7, 8 exemplified in FIG. 7, FIG. 8, FIG. 9 and FIG. 10 the voltage on the respective DC voltage rail system 9a, 9b can be set with advantage. This setting is performed such that the voltage on the DC voltage rail system 9a, 9b is lower than the voltage between the first and second connection 5a, 5b, 6a, 6b of the respective DC voltage circuit 4a, 4b. Through the voltage of the DC voltage rail system 9a, 9b which is lower in comparison with the respective DC voltage circuit 4a, 4b the insulation distance of the rail system legs of the DC voltage rail system 9a, 9b can be reduced so that advantageously space can be saved and the installation and maintenance expenditure additionally kept low or minimized. Furthermore, further feeding of the second DC voltage rail system 9b not affected by the fault or the failure for example of the first step-down converter 7 is possible through the respective second step-down converter 8 so that the second auxiliary operating facilities 10b can continue to be fed by way of their inverters and/or DC voltage converters. The exemplary device is thus highly robust, not susceptible to faults and characterized by high availability.

As exemplified in FIG. 7, FIG. 8, FIG. 9 and FIG. 10 the respective step-down converter 7, 8 can be formed through a series circuit of a controllable power semiconductor switch 11 with a diode 12 and through a capacity 13 connected parallel to the series circuit of the controllable power semiconductor switch 11 with the diode 12. As shown in FIG. 7, FIG. 8, FIG. 9 and FIG. 10 the controllable power semiconductor switch 11 can be based on a bipolar transistor with gate electrode arranged in an insulated manner (IGBT). However, the controllable power semiconductor switch can be based on a power MOSFET, a turn-off thyristor (GTO—Gate Turn-Off Thyristor) or an integrated thyristor with commutated gate electrode (IGCT—Integrated Gate Commutated Thyristor). As shown in FIG. 7, FIG. 8, FIG. 9 and FIG. 10 with the respective step-down converter 7, 8 the controllable power semiconductor switch 11 can be additionally connected with the first connection 5a, 5b of the respective DC voltage circuit 4a, 4b and the diode 12 with the second connection 6a, 6b of the respective DC voltage circuit 4a, 4b. In addition, with the respective step-down converter 7, 8, the diode 12 is connected through a first connection 14 and the connection point of the diode 12 with the controllable power semiconductor switch 11 through a second connection 15 with the respective DC voltage rail system 9a, 9b, i.e. with the first step-down converter 7 the diode 12 is connected through the first connection 14 and the connecting point of the diode 12 with the controllable power semiconductor switch 11 is connected with the second DC voltage rail system 9b through the second connection 15. The respective step-down converter 7, 8 consequently manages with a minimum number of components and can thus be realised very easily and space-savingly. Through the low number of components the first and second step-down converter 7, 8 is particularly robust and not susceptible to faults and therefore has a high availability.

As exemplified in FIG. 7, FIG. 8, FIG. 9 and FIG. 10, with the respective step-down converter 7, 8, e.g., with the first step-down converter 7 and with the second step-down converter 8 a filter circuit 16 can be additionally connected between the first connection 14 and the respective DC voltage rail system 9a, 9b and to the second connection 15. The filter circuit 16 advantageously results in that undesirable voltage fluctuations and current fluctuations created through switching actions of the respective step-down converter 7, 8 are filtered out so that the voltage of the first and second DC voltage rail system 9a, 9b, i.e. the voltage present between the rail system legs, is nearly a DC voltage.

Figure 7:
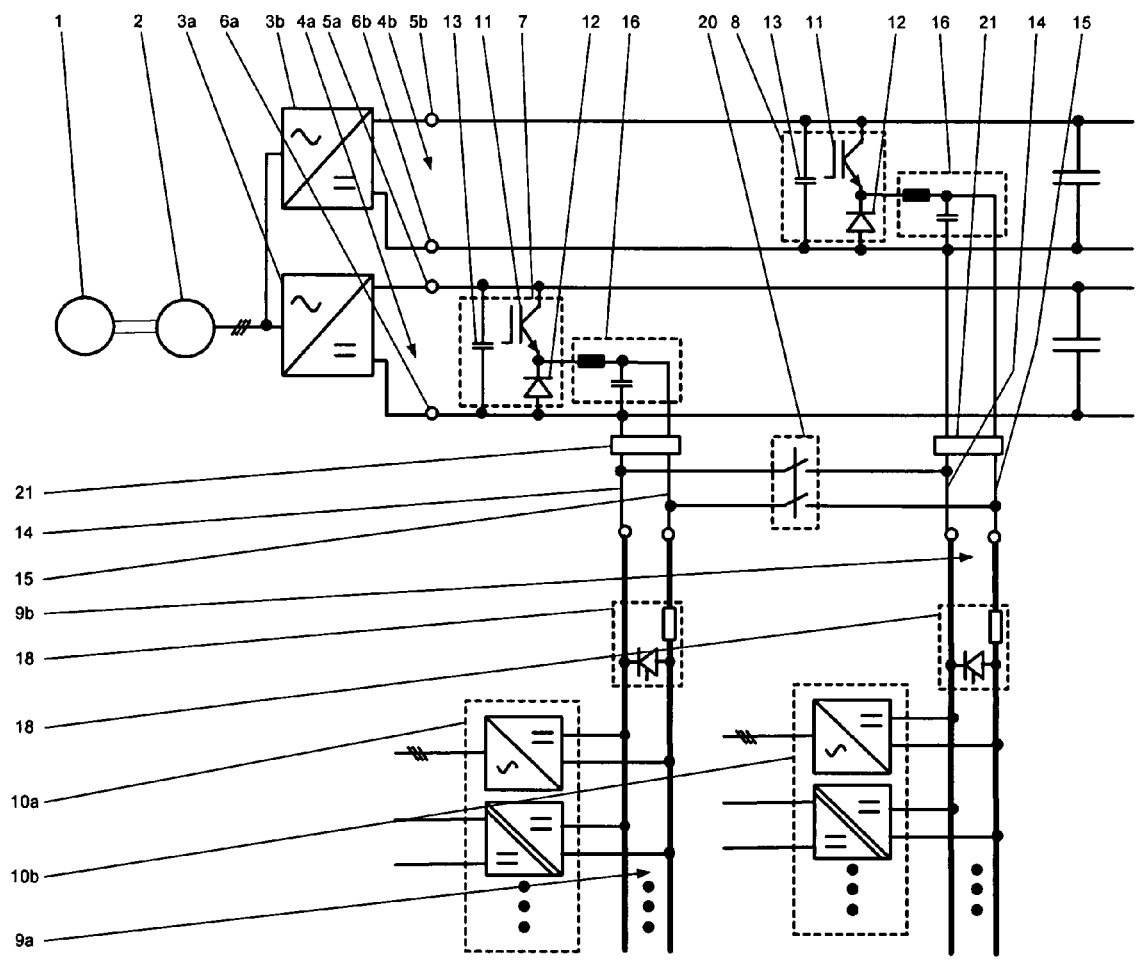
FIG. 7 shows a seventh exemplary embodiment of the device.
Figure 8:
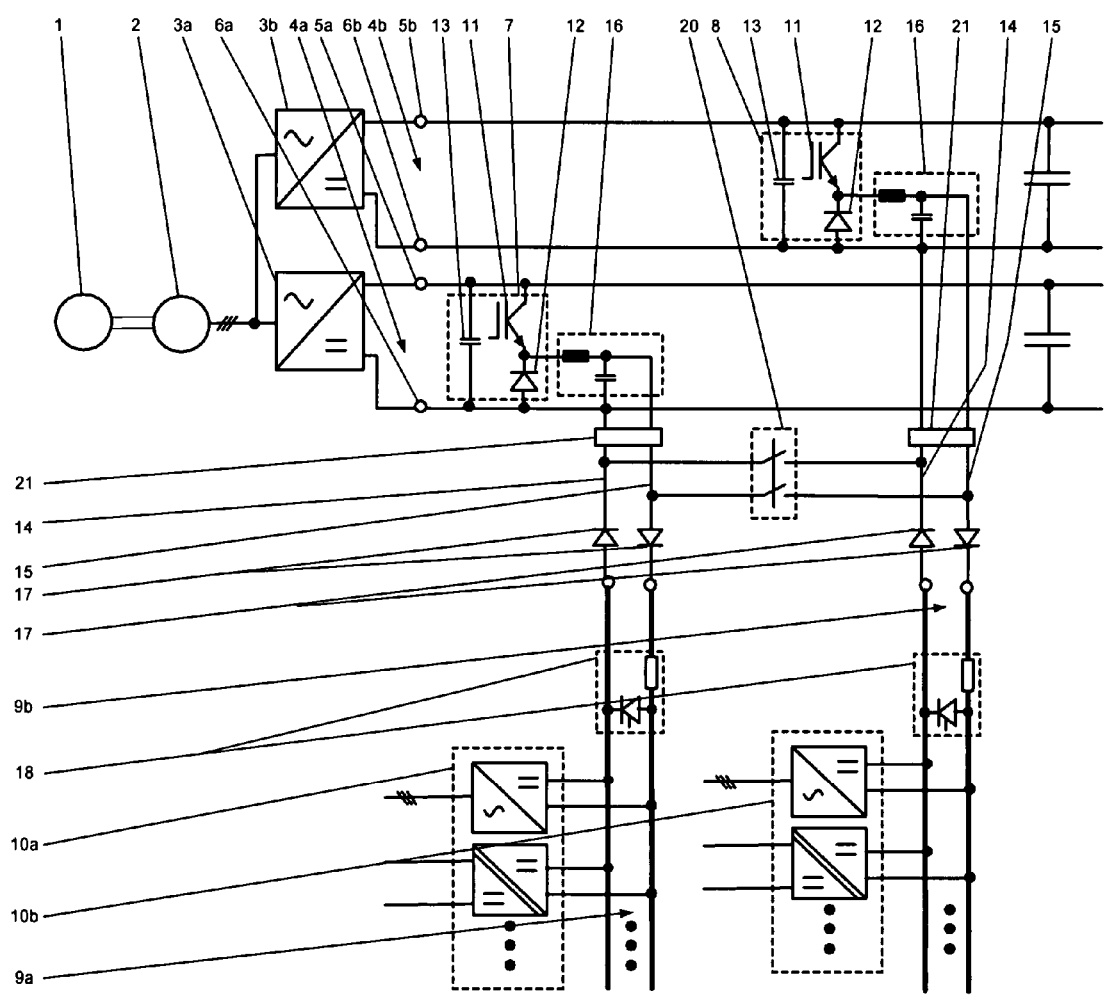
FIG. 8 shows an eighth exemplary embodiment of the device.

In the eighth exemplary embodiment of the device as shown in FIG. 8, in contrast with the seventh exemplary embodiment shown in FIG. 7, with the respective step-down converter 7,8, a current direction limitation element 17 each is connected to the first connection 14 and to the second connection 15. The respective current direction limitation element 17 serves to ensure that only a current in defined current direction flows from the respective step-down converter 7, 8 to the respective DC voltage rail system 9a, 9b and, in a defined manner, back again. As a result, it is advantageously avoided that a fault current, for example caused through faults of the respective DC voltage rail system 9a, 9b and/or a fault in one or in several auxiliary operating facilities 10a, 10b, can flow back to the respective step-down converter 7, 8 and damage or even destroy the respective step-down converter 7, 8. The respective current direction limitation element 17 according to FIG. 8 is preferably designed as a diode and consequently can be realised very easily and space-savingly.

Figure 9:
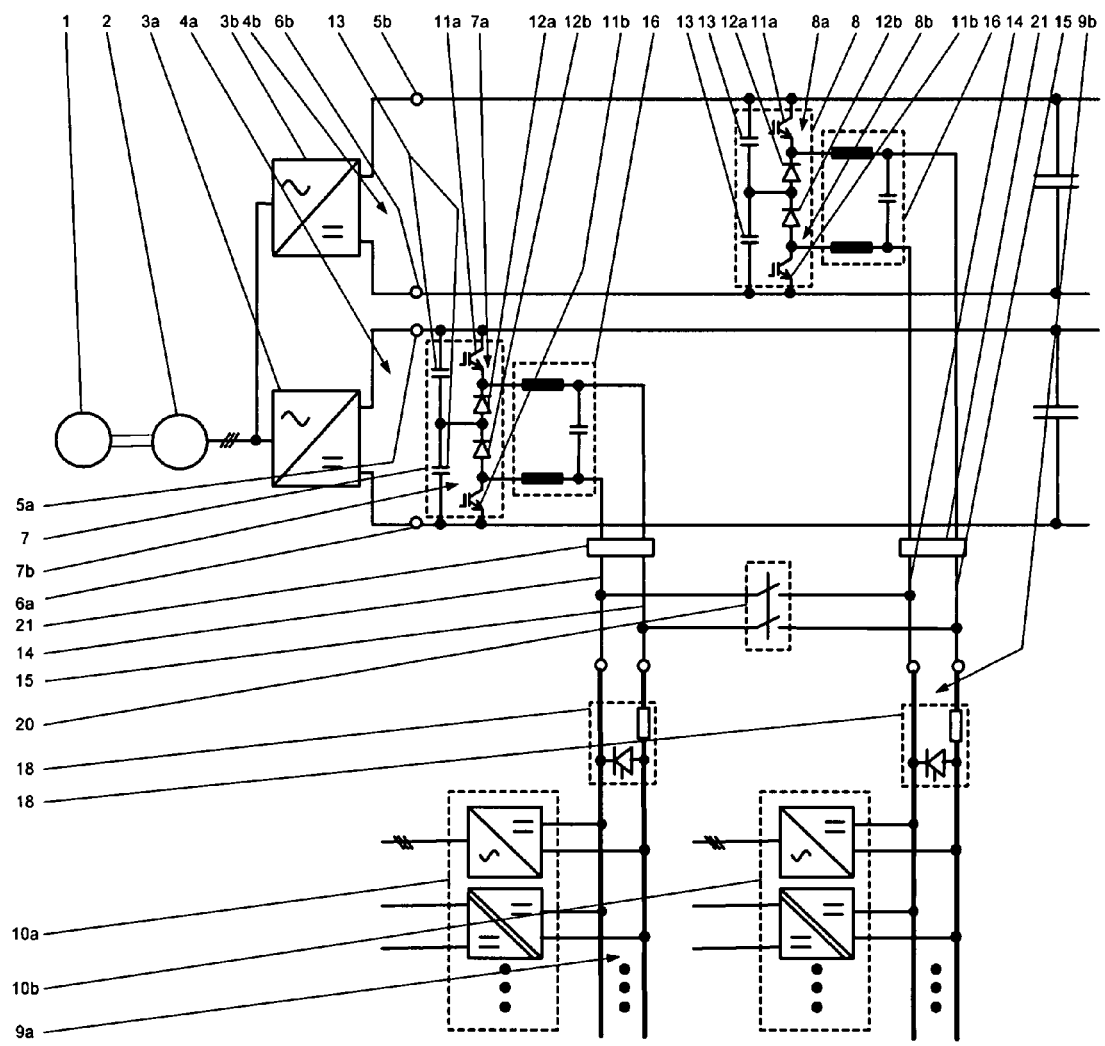
FIG. 9 shows a ninth exemplary embodiment of the device and FIG. 10 shows a tenth exemplary embodiment of the device.

In a ninth exemplary embodiment of the device as shown in FIG. 9 in contrast with the seventh and eighth exemplary embodiment as shown in FIG. 7 and FIG. 8, the respective step-down converter 7, 8 is formed through a first and a second series circuit 7a, 7b, 8a, 8b each of a controllable power semiconductor switch 11a, 11b with a diode 12a, 12b and through a capacity 13 each connected in parallel with each series circuit, wherein with the respective step-down converter 7,8 the diode 12a of the first series circuit 7a, 8a is connected with a diode 12b of the second series circuit 7b, 8b. As exemplified in FIG. 9, the controllable power semiconductor switch 11a, 11b can be based on a bipolar transistor with gate electrode arranged in an insulated manner (IGBT). However, the controllable power semiconductor switch can be based on a power MOSFET, a turn-off thyristor (GTO—Gate Turn-Off Thyristor) or an integrated thyristor with commutated gate electrode (IGCT—Integrated Gate Commutated Thyristor). As shown in FIG. 9, with the respective step-down converter 7, 8, the controllable power semi-conductor switch 11a of the first series circuit 7a, 8a is connected with the first connection 5a, 5b of the corresponding DC voltage circuit 4a, 4b and the controllable power semiconductor switch 11b of the second series circuit 7b, 8b with the second connection 6a, 6b of the respective DC voltage circuit 4a, 4b. Furthermore, with the respective step-down converter 7, 8, the connecting point of the diode 12a of the first series circuit 7a, 8b with the controllable power semiconductor switch 11a of the first series circuit 7a, 8a is connected with the respective DC voltage rail system 9a, 9b through a first connection 14, i.e. with the first step-down converter 7 the connecting point of the diode 12a of the first series circuit 7a with the controllable power semiconductor switch 11a of the first series circuit 7a is connected with the first DC voltage rail system 9a through the first connection 14 and with the second step-down converter 8 the connecting point of the diode 12a of the first series circuit 8a with the controllable power semiconductor switch 11a of the first series circuit is connected with the second DC voltage rail system 9b through the first connection 14. In addition, with the respective step-down converter 7, 8 the connecting point of the diode 12b of the second series circuit 7b, 8b with the controllable power semiconductor switch 11b of the second series circuit 7b, 8b is connected with the respective DC voltage rail system 9a, 9b through a second connection 15, i.e. with the first step-down converter 7 the connecting point of the diode 12b of the second series circuit 7b with the controllable semiconductor switch 11b of the second series circuit 7b is connected with the first DC voltage rail system 9a through a second connection 15 and with the second step-down converter 8 the connecting point of the diode 12b of the second series circuit 8b with the controllable power semiconductor switch 11b of the second series circuit 8b is connected with the second DC voltage rail system 9b through a second connection 15. Through the exemplary embodiments of the first and second step-down converter 7, 8 described above a higher voltage of the respective DC voltage 4a, 4b in comparison with the embodiment of the first and second step-down converter 7, 8 as exemplified in FIG. 7 and FIG. 8 can be connected since this voltage is split over the two capacities 13 of the respective step-down converters 7, 8. If however a comparable voltage of the respective DC voltage circuit 4a, 4b as with the embodiment of the first and second step-down converter 7, 8 according to FIG. 7 and FIG. 8 is selected, because of the splitting of this voltage over the two capacities 13 of the respective step-down converter 7, 8, economical low voltage semiconductors can be used for the corresponding controllable semiconductor switches 11a, 11b and diodes 12a, 12b, which can be operated with a high switching frequency. Step-down converters 7, 8 designed such advantageously generate less undesirable voltage fluctuations and current fluctuations and consequently cause less EMC problems. In addition, step-down converters 7, 8 designed thus only have minimum conductance and switching losses so that the step-down converters 7, 8 can be operated particularly efficiently. The respective step-down converter 7, 8 as exemplified in FIG. 9 additionally manages with a minimum quantity of components and can consequently be realised very easily and space-savingly. Through the low quantity of components the first and second step-down converter 7, 8 is particularly robust and not susceptible to faults and thus has a high availability.

As exemplified in FIG. 9, with the respective step-down converter 7, 8, i.e. with the first step-down converter 7 and with the second step-down converter 8 a filter circuit 16 is additionally connected between the first connection 14 and the respective DC voltage rail system 9a, 9b and to the second connection 15. The filter circuit 16 advantageously results in that undesirable voltage fluctuations and current fluctuations created through switching actions of the respective step-down converter 7, 8 are filtered out so that the voltage of the first and second DC voltage rail system 9a, 9b, i.e. the voltage present between the respective rail system legs, is nearly a DC voltage.

Figure 10:
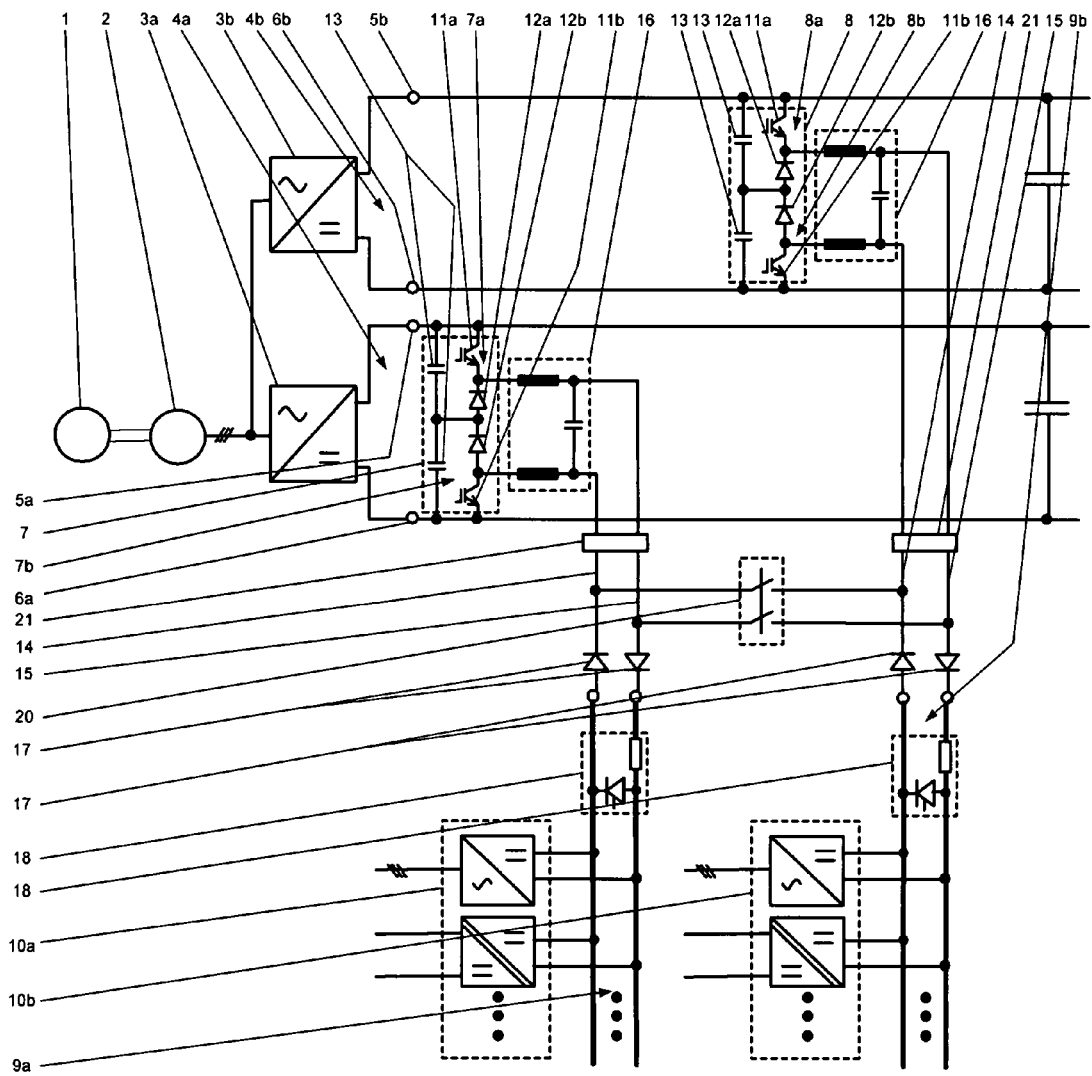

In a tenth exemplary embodiment of the device as shown in FIG. 10, in contrast with the ninth exemplary embodiment according to FIG. 9, with the respective step-down converter 7, 8, a current direction limitation element 17 each can be connected to the first connection 14 and to the second connection 15. The respective current direction limitation element 17 serves to ensure that only a current in defined current direction flows from the respective step-down converter 7, 8 to the respective DC voltage rail system 9a, 9b and, in a defined manner, back again. As a result it is advantageously avoided that a fault current for example caused through a fault of the respective DC voltage rail system 9a, 9b and/or a fault in one or in several auxiliary operating facilities 10a, 10b can flow back to the respective step-down converter 7, 8 and damage or even destroy the respective step-down converter 7, 8. The respective current direction limitation element 17 according to FIG. 10 can be based on a diode and can thus be realised advantageously very easily and space-savingly.

With all exemplary embodiments of the device as shown in FIG. 7, FIG. 8, FIG. 9 and FIG. 10 the first and the second DC voltage rail system 9a, 9b each can be an overvoltage limitation network 18. The overvoltage limitation network 18 is formed through a resistor and a controllable switch, preferably a controllable power semiconductor switch, wherein the overvoltage limitation network 18 is actuated through closing of the switch in the event that an overvoltage of the voltage of the DC voltage rail system 9a, 9b should occur. Advantageously energy of the DC voltage rail system a, 9b is converted into heat in the resistor when the switch is actuated and the voltage of the DC voltage rail system 9a, 9b consequently reduced easily, quickly and effectively. The actuation of the overvoltage limitation network 18 is preferably carried out for a specified period of time. This period of time is preferably specified as a function of the thermal capacity of the resistor. Actuation is performed according to criteria known to the expert which will not be discussed in more detail at this point.

In addition to this, with all exemplary embodiments of the device as shown in FIG. 7, FIG. 8, FIG. 9 and FIG. 10, a connecting element 20 can be connected between the first connection 14 relative to the first DC voltage rail system 9a and the first connection 14 relative to the second DC voltage rail system 9b and between the second connection 15 relative to the first DC voltage rail system 9a and the second connection 15 relative to the second DC voltage rail system 9b. In normal operation of the device the connecting element 20 is open, i.e. the first connection 14 relative to the first DC voltage rail system 9a and the first connection 14 relative to the second DC voltage rail system 9b are not connected with each other and the second connection 15 relative to the first DC voltage rail system 9a and the second Connection 15 relative to the second DC voltage rail system 9b are not connected with each other either. In the event of a fault or a failure for example of the first step-down converter 7 the connecting element 20 is closed, e.g., the first connection 14 relative to the first DC voltage rail system 9a and the first connection 14 relative to the second DC voltage rail system 9b are then connected with each other and the second connection 15 relative to the first DC voltage rail system 9a and the second connection 15 relative to the second DC voltage rail system 9b are then also connected. Feeding of the first DC voltage rail system 9a is thus advantageously effected by way of the second step-down converter 8 so that the first auxiliary operating facilities 10 can continue to be fed via their inverters and/or DC voltage converters. Such a possible redundant feed of the respective DC voltage rail system 9a, 9b brings about further improvement of the robustness and the non-susceptibility to faults, while the availability can be further increased at the same time The connecting element is 20 can be embodied as a low-inductive switch, for example as mechanical or as controllable power semiconductor switch.

To isolate a faulty or failed step-down converter 7, 8 as mentioned above an isolating element 20 can be connected to the first and second connection 14, 15 with the respective step-down converter 7, 8 in all exemplary embodiments of the device as shown in FIG. 7, FIG. 8, FIG. 9 and FIG. 10. As a result, it is advantageously ensured that the faulty or failed step-down converter 7, 8 does not for example short-circuit the corresponding first and second connection 14, 15. The isolating element 20 can be embodied as low-inductive switch, for example as a mechanical or as controllable power semiconductor switch, or as a fuse.

LIST OF REFERENCE NUMBERS

1 Combustion engine
2 Generator
3 Rectifier
3a First rectifier
3b Second rectifier 4 DC voltage circuit
4a First DC voltage circuit
4b Second DC voltage circuit
5 First connection of the DC voltage circuit
5a First connection of the first DC voltage circuit
5b First connection of the second DC voltage circuit
6 Second connection of the DC voltage circuit
6a Second connection of the first DC voltage circuit
6b Second connection of the second DC voltage circuit
7 First step-down converter
7a First series circuit of the first step-down converter
7b Second series circuit of the first step-down converter
8 Second step-down converter
8a First series circuit of the second step-down converter
8b Second series circuit of the second step-down converter
9a First DC voltage rail system
9b Second DC voltage rail system
10 Auxiliary operating facilities
11 Controllable power semiconductor switch
11a Controllable power semiconductor switch of the first series circuit of the first and second step-down converter
11b Controllable power semiconductor switch of the second series circuit of the first and second step-down converter
12 Diode
12a Diode of the first series circuit of the first and second step-down converter
12b Diode of the second series circuit of the first and second step-down converter
13 Capacity
14 First connection
15 Second connection
16 Filter circuit
17 Current direction limitation element
18 Overvoltage limitation network
19 Capacity of the first voltage increase limitation network
20 Connecting element
21 Isolating element
22 Further rectifier

The invention claimed is:

1. A device for feeding auxiliary operating facilities of a fuel-electrically driven vehicle with a combustion engine, with a generator driven by the combustion engine, with a rectifier connected with the generator on the AC voltage side and assigned to the generator, wherein the rectifier on the DC voltage side is connected with a first and a second connection of a DC voltage circuit assigned to the rectifier and connected downstream of the rectifier, wherein, a first and a second step-down converter each is connected with the first and second connection of the DC voltage circuit, and wherein the first step-down converter is connected to a first DC voltage rail system for the feeding of the auxiliary operating facilities assigned to the first step-down converter and connected downstream of the first step-down converter and the second step-down converter is connected to a second DC voltage rail system for the feeding of the auxiliary operating facilities assigned to the second step-down converter and connected downstream of the second step-down converter.

2. The device according to claim 1, wherein the respective step-down converter is formed through a series circuit of a controllable power semiconductor switch with a diode and through a capacity connected parallel to the series circuit of the controllable power semiconductor switch with the diode.

3. The device according to claim 2, wherein with the respective step-down converter the controllable power semiconductor switch is connected with the first connection of the DC voltage circuit and the diode with the second connection of the DC voltage circuit, and wherein with the respective step-down converter the diode is connected with the respective DC voltage rail system through a first connection and the connecting point of the diode with the controllable power semiconductor switch through a second connection.

4. The device according to claim 3, wherein with the respective step-down converter a filter circuit is connected between the first connection and the respective DC voltage rail system and to the second connection.

5. The device according to claim 3, wherein with the respective step-down converter a current direction limitation element each is connected to the first connection and into the second connection.

6. The device according to claim 3, wherein with a connecting element is connected between the first connection relative to the first DC voltage rail system and the first connection relative to the second DC voltage rail system and between the second connection relative to the first DC voltage rail system and the second connection relative to the second DC voltage rail system.

7. The device according to claim 6, wherein with the respective step-down converter an isolating element is connected to the first connection and to the second connection.

8. The device according to claim 1, wherein the respective step-down converter is formed through a first and a second series circuit each of a controllable power semiconductor switch with a diode and through a capacity each connected parallel to each series circuit, wherein the diode of the first series circuit is connected with the diode of the second series circuit.

9. The device according to claim 8, wherein with the respective step-down converter the controllable power semiconductor switch of the first series circuit is connected with the first connection of the DC voltage circuit and the controllable power semiconductor switch of the second series circuit with the second connection of the DC voltage circuit, that with the respective step-down converter the connecting point of the diode of the first series circuit with the controllable power semiconductor switch of the first series circuit is connected with the respective DC voltage rail system through a first connection, and wherein with the respective step-down converter the connecting point of the diode of the second series circuit with the controllable power semiconductor switch of the second series circuit is connected with the respective DC voltage rail system through a second connection.

10. The device according claim 9, wherein with the respective step-down converter a filter circuit is connected between the first connection and the respective DC voltage rail system and between the second connection and the respective DC voltage rail system.

11. The device according to claim 1, wherein the first and second DC voltage rail system each has an overvoltage limitation network.

12. A device for feeding auxiliary operating facilities of a fuel-electrically driven vehicle with a combustion engine, with a generator driven by the combustion engine, with a rectifier connected with the generator on the AC voltage side and assigned to the generator, wherein the rectifier on the DC voltage side is connected with a first and a second connection of a DC voltage circuit assigned to the rectifier and connected downstream of the rectifier, wherein a first step-down converter is connected with the first and second connection of the DC voltage circuit, and wherein the first step-down converter is connected to a first DC voltage rail system for the feeding of the auxiliary operating facilities assigned to the first step-down converter and connected downstream of the first step-down converter and a further rectifier is connected with the generator on the AC voltage side and assigned to the generator is connected with a DC voltage rail system for the feeding of auxiliary operating facilities assigned to the further rectifier and connected downstream of the further rectifier.

13. The device according to claim 12, wherein the further rectifier is connected with the second DC voltage rail system through a first connection and through a second connection.

14. The device according to claims 13, wherein with the further rectifier a current direction limitation element each is connected to the first connection and the second connection.

15. The device according to claim 13, wherein with the further rectifier an isolating element is connected to the first and second connection.

16. The device according to claim 12, wherein the respective step-down converter is formed through a series circuit of a controllable power semiconductor switch with a diode and through a capacity connected parallel to the series circuit of the controllable power semiconductor switch with the diode.

17. The device according to claim 12, wherein the respective step-down converter is formed through a first and a second series circuit each of a controllable power semiconductor switch with a diode and through a capacity each connected parallel to each series circuit, wherein the diode of the first series circuit is connected with the diode of the second series circuit.

18. The device according to claim 12, wherein with the further rectifier an isolating element is connected to the first and second connection.

19. The device according to claim 12, wherein the first and second DC voltage rail system each has an overvoltage limitation network.

20. The device for feeding auxiliary operating facilities of a fuel-electrically driven vehicle with a combustion engine, with a generator driven by the combustion engine, with first and second rectifiers connected with the generator on the AC voltage side and assigned to the generator, wherein the first rectifier on the DC voltage side is connected with a first and a second connection of a first DC voltage circuit assigned to the first rectifier and connected downstream of the first rectifier and the second rectifier on the DC voltage side with a first and a second connection of a second DC voltage circuit assigned to the second rectifier and connected downstream of the second rectifier, wherein, a first step-down converter is connected with the first and second connection (5a, 6a) of the first DC voltage circuit and a second step-down converter with the first and second connection of the second DC voltage circuit, and wherein the first step-down converter is connected with a first DC voltage rail system for the feeding of the auxiliary operating facilities assigned to the first step-down converter and connected downstream of the first step-down converter, and wherein the second step-down converter is connected with a second DC voltage rail system for the feeding of the auxiliary operating facilities assigned to the second step-down converter and connected downstream of the second step-down converter.

21. The device according to claim 20, wherein the respective step-down converter is formed through a series circuit of a controllable power semiconductor switch with a diode and through a capacity switched parallel with the series circuit of the controllable power semiconductor switch with the diode.

22. The device according to claim 21, wherein with the respective step-down converter the controllable power semiconductor switch is connected with the first connection of the respective DC voltage circuit and the diode with the second connection of the corresponding DC voltage circuit, and wherein with the respective step-down converter the diode is connected with the respective DC voltage rail system through a first connection and the connecting point of the diode with the controllable power semiconductor switch through a second connection.

23. The device according to claim 22, wherein with the respective step-down converter a filter circuit is connected between the first connection and the respective DC voltage rail system and to the second connection.

24. The device according to claim 22, wherein with the respective step-down converter a current direction limitation element each is connected to the first connection and to the second connection.

25. The device according to claim 22, wherein with a connecting element is connected between the first connection relative to the first DC voltage rail system and the first connection relative to the second DC voltage rail system and between the second connection relative to the first DC voltage rail system and the second connection relative to the second DC voltage rail system.

26. The device according to claim 25, wherein with the respective step-down converter an isolating element is connected to the first and second connection.

27. The device according to claim 20, wherein the respective step-down converter is formed through a first and a second series circuit each of a controllable power semiconductor switch with a diode and through a capacity each connected in parallel with each series circuit, wherein the diode of the first series circuit is connected with the diode of the second series circuit.

28. The device according to claim 27, wherein with the respective step-down converter the controllable power semiconductor switch of the first series circuit is connected with the first connection of the respective DC voltage circuit and the controllable power semiconductor switch of the second series circuit with the second connection of the respective DC voltage circuit that, with the respective step-down converter the connecting point of the diode of the first series circuit with the controllable power semiconductor switch of the first series circuit is connected with the respective DC voltage rail system through a first connection, and that with the respective step-down converter the connecting point of the diode of the second series circuit with the controllable power semiconductor switch of the second series circuit is connected with the respective DC voltage rail system through a second connection.

29. The device according to claim 28, wherein with the respective step-down converter a filter circuit is connected between the first connection and the respective DC voltage rail system and between the second connection and the respective DC voltage rail system.

30. The device according to claim 20, wherein the first and second DC voltage rail system each has an overvoltage limitation network.

* * * * *